(No Model.)　　　　　　J. C. HENRY.　　　4 Sheets—Sheet 4.
SPEED RECORDER.
No. 270,431.　　　　　　　　Patented Jan. 9, 1883.
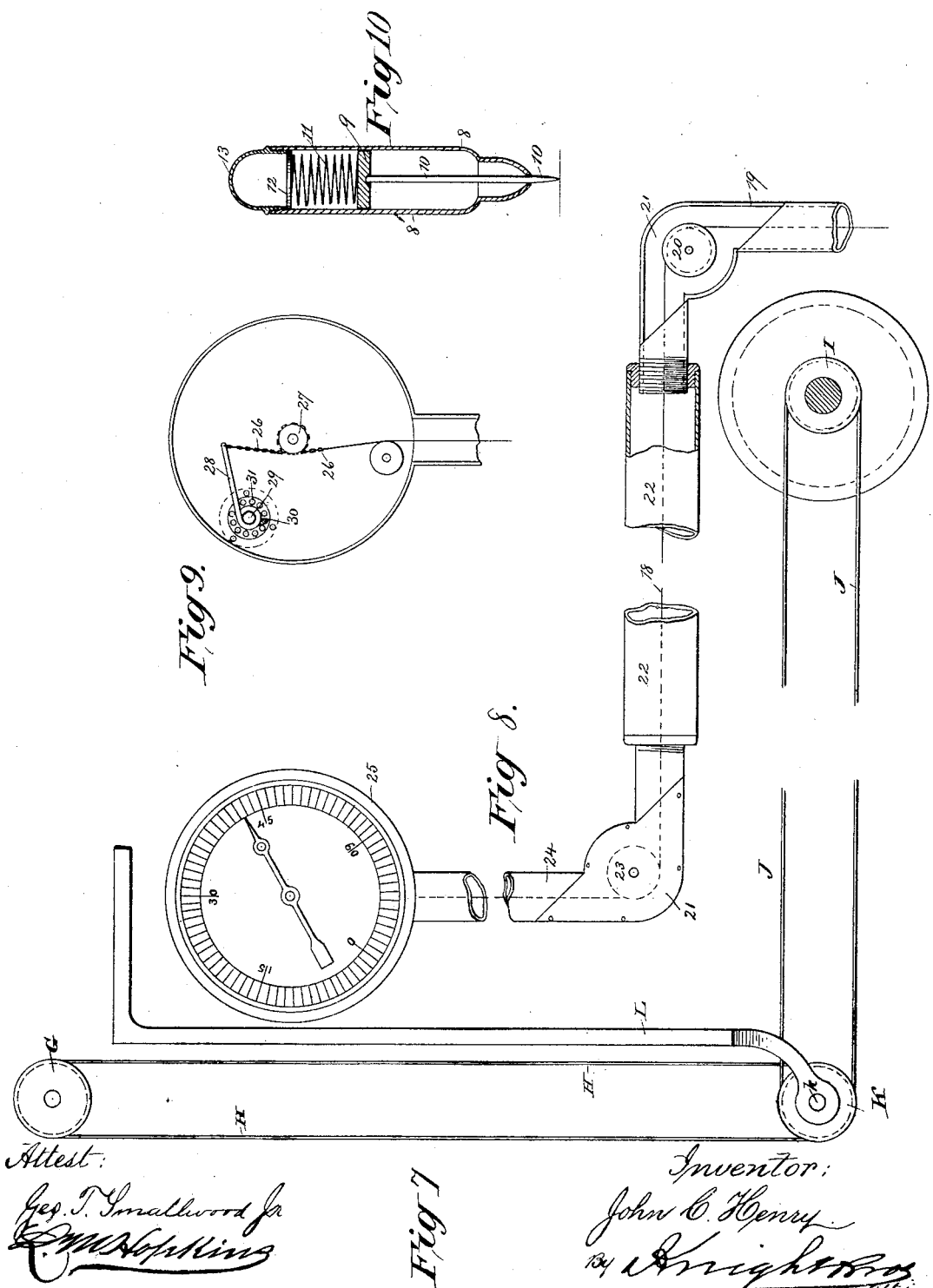
Attest:　　　　　　　　　　　　　　Inventor:
Geo. T. Smallwood Jr.　　　　　　　John C. Henry
W. M. Hopkins　　　　　　　　　By Knight Bros.
　　　　　　　　　　　　　　　　　　Atty's

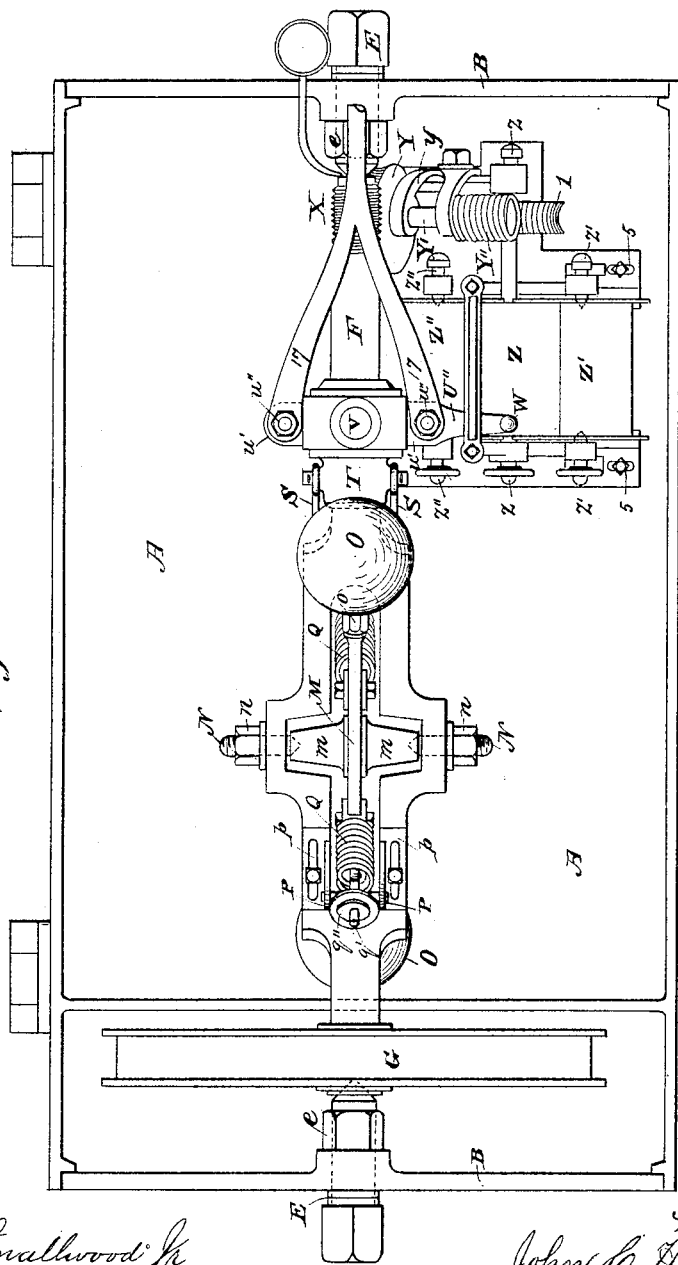

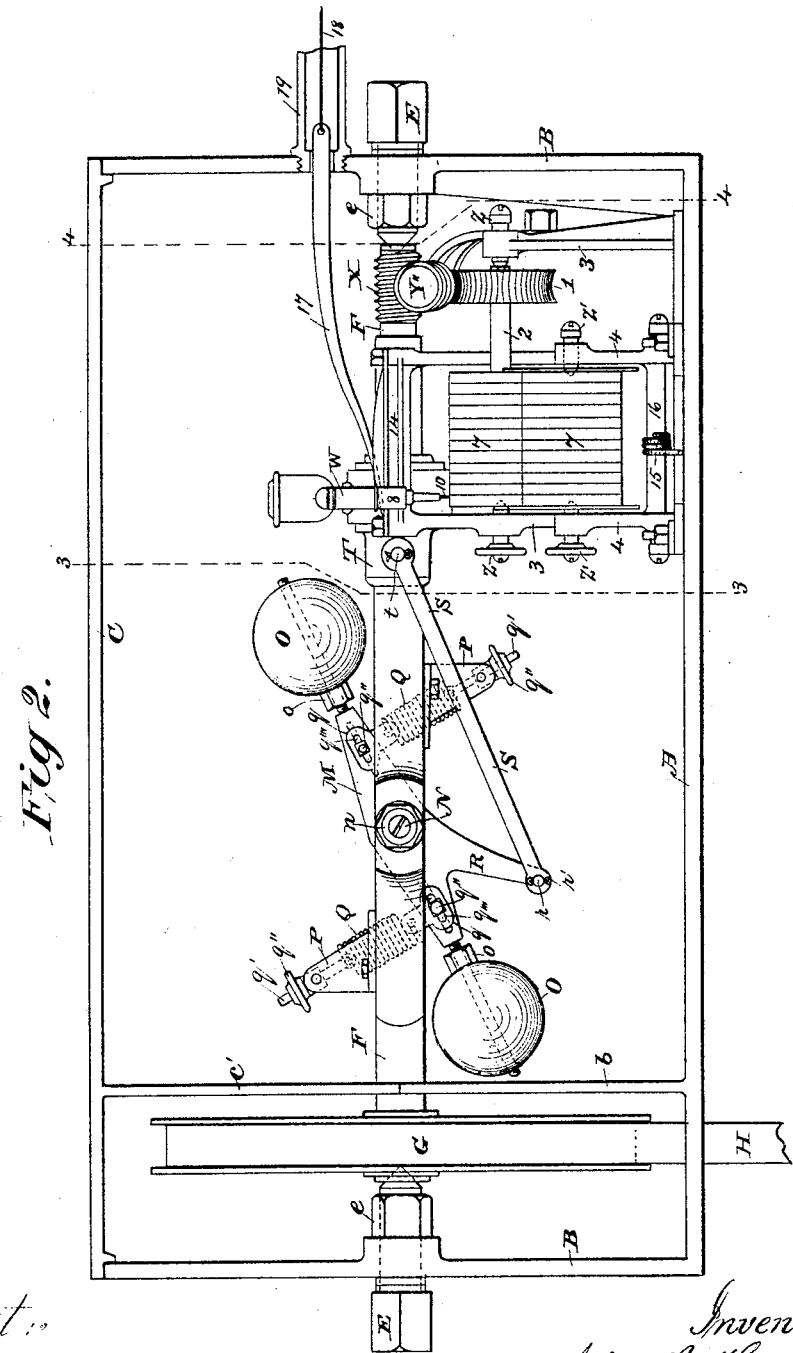

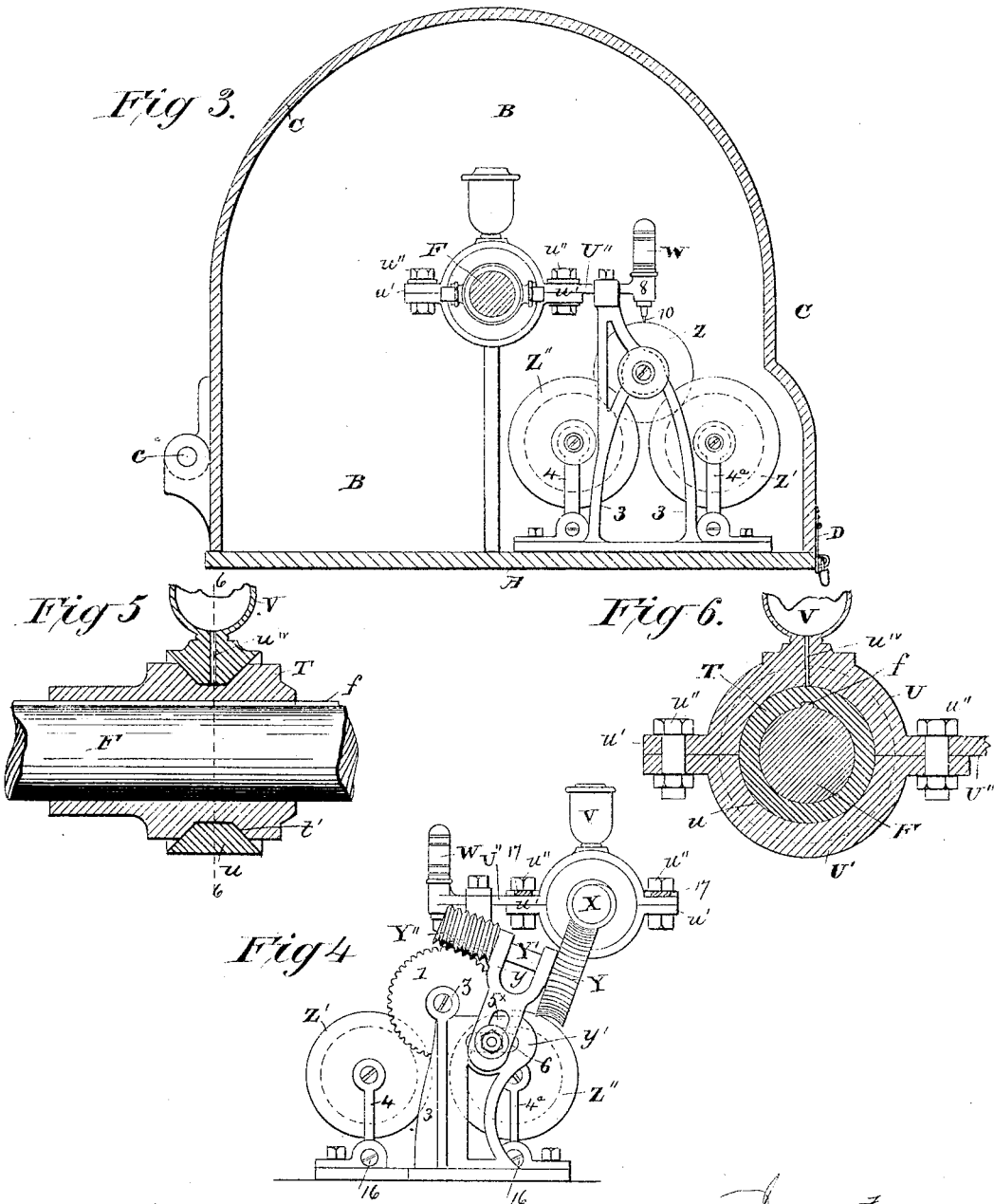

UNITED STATES PATENT OFFICE.

JOHN C. HENRY, OF KANSAS CITY, MISSOURI, ASSIGNOR OF ONE-HALF TO L. W. TOWNE AND P. F. CLINTON, OF SAME PLACE, AND J. L. BARNES, OF LAWRENCE, KANSAS.

SPEED-RECORDER.

SPECIFICATION forming part of Letters Patent No. 270,431, dated January 9, 1883.

Application filed May 4, 1882. (No model.)

*To all whom it may concern:*

Be it known that I, JOHN C. HENRY, a citizen of the United States, residing at Kansas City, in the county of Jackson and State of Missouri, have invented certain new and useful Improvements in Speed Recorders, Indicators, and Distance-Measurers, of which the following is a specification.

My invention relates particularly to those instruments which are intended to record the speed of railway-trains, and has for its object the production of an instrument which will record, by marking on a traveling paper or ribbon suitably divided by lines to indicate both distance and speed, the velocity of the train to which it is applied at any part of its journey and at the same time actuate an indicator or gage in the engineer's cab, to keep the engineer constantly informed of the speed of his train. Devices heretofore suggested for this purpose, on account of the imperfect nature of the governor or other actuating mechanism employed and of the multiplicity and weakness of their moving parts, are very irregular in their operation, being liable to be affected in the constant jar of the locomotive or car, so as to render the recording jerky and unreliable.

The present invention consists in certain devices for accomplishing the purposes above set out with greater accuracy and evenness than has been before attained in instruments of this character, and to certain details in the construction of the instrument and its protecting-casing, hereinafter more fully set forth.

In order that my invention may be more fully understood, I will proceed to describe it with reference to the accompanying drawings, in which—

Figure 1 is a plan view of my recording-instrument and the mechanism for actuating the same. Fig. 2 is a side-elevation of the same. Fig. 3 is a sectional view of the recorder, taken on the line 3 3, Fig. 2. Fig. 4 is a sectional elevation on the line 4 4, Fig. 2. Fig. 5 is a vertical section of a portion of the driving-shaft and the sliding sleeve and its accessories. Fig. 6 is a vertical section on the line 6 6, Fig. 5. Fig. 7 is a detached view of the preferred form of gearing employed to transmit motion from the truck-axle to the driving-shaft. Fig. 8 represents the indicator and sections of transmitting mechanism and its protecting-tube. Fig. 9 is a view of the indicator with the dial removed. Fig. 10 is a detached view of the preferred form of recording-pen employed.

A is the base, B the ends, and C the top, of the box or casing containing my improved recording-instrument and its accessories. The top C is hinged to the base or ends, as shown at c, adapting it to be lifted to display or for access to the instrument, and may be securely locked to prevent meddling with the same, a lock for this purpose being shown at D in Fig. 3.

Bearing-pins E, adjustable in the ends B of the casing, and adapted to be set at any desired point by nuts e, support between their inner ends a rotary shaft, F, traversing the whole length of the casing.

On one end of shaft F is cast or keyed a pulley or band-wheel, G, carrying belt H, for transmitting motion from a truck axle to the shaft F.

The mechanism for transmitting motion from the truck-axle to shaft F is shown detached in Fig. 7. A pulley, I, preferably on one axle of the forward truck of the locomotive, (these axles always rotating so long as the train is in motion, being better adapted for the purpose than other axles of the train,) carries a belt, J, passing over one face of a double pulley, K, keyed to a shaft, k, whose ends are supported by and have bearing in hangers L, preferably of spring-steel, whose upper ends are bolted or otherwise secured to the frame of the locomotive. The other face of pulley K receives belt H, which runs also, as before stated, over pulley G on shaft F. It will now be seen that as the truck-axle revolves it will, by means of the mechanism just described, impart a continuous rotary motion to shaft F. The constant springing of the engine from the truck will not vary the tension on the belts, as the hanger L will readily yield to the springing motion of the engine, and return to its vertical position on release of pressure by the engine resettling on its springs.

The hinged top C of the casing is provided near one end with a partition, c', attached thereto, meeting, when said top is closed, corresponding partition $b$, extending from the base B, serving, when thus joined by the closure of the top, to form a diaphragm for the purpose of excluding the dust, &c., carried up by the belt H from the interior of the casing.

The shaft F is cast with a longitudinal slot near one end for the reception of my improved mechanism controlling the position of the recording pen or pencil and the indicator. This regulator is constructed as shown in Figs. 1 and 2.

The arm M, occupying the slot in shaft F, is cast in one with trunnions $m$ $m$ on each side thereof, having conical bearings or sockets to receive the conical ends of set-screws N, adjustable in shaft F by means of nuts $n$ for the purpose of taking up wear in the bearings and adjusting the regulator in an exactly central position in the shaft F. The arm M is screw-threaded on each end for the reception of regulator-balls O, fixed to any position thereon by means of nuts $o$. These balls may be set out or in from the center of arm M, to increase or lessen their momentum when the shaft F is in motion.

Abutments P P, bolted to shaft F on opposite sides, have flanges $p$ $p$, which are slotted, as shown in Fig. 1, to render the said abutments adjustable longitudinally on said shaft.

Springs Q Q, having at one end flattened tongues or plates $q$ $q$, bolted to arm M, and at the other end a screw-threaded pin, $q'$, passing through holes in the abutments, and adjustable to regulate the tension of the spring, by means of thumb-nuts $q''$, serve to forcibly draw the arm M back to its normal position—that is, away from a position perpendicular to the shaft F—on a slowing of the shaft's rotation and consequent relaxing of the centrifugal force of the regulator.

Slots $q'''$ in the end of tongues $q$ and in the arm M permit the adjustment of the spring outward or inward on the arm M, so as to increase or lessen its effective force thereon.

It will be readily seen that the regulator above described, supported axially on the rotary shaft and accurately adjustable so as to be exactly balanced on each side of said shaft, is especially adapted for use on a recorder of a locomotive, the constant jarring of which, both vertically and horizontally, cannot affect in the slightest degree the evenness and smoothness of action of the regulator. The Watt and other old forms of regulators are entirely inapplicable to this purpose, as every slight jar of the engine would cause them to be constantly thrown from their normal position, rendering the recording jerky and unreliable.

It is evident that the form of governor here described could be applied as well to and would operate as perfectly on a vertical as a horizontal shaft.

An arm, R, projecting from the arm M and cast integrally therewith, carries at its lower end wrist-pins $r$, on which connecting-rods S are held by keys $r'$. Said connecting-rods S are similarly hinged at their other ends to pins $t$ on sleeve T, adapted to slide on main shaft F. The preferred construction of this sliding sleeve is shown in Figs. 5 and 6, which represent sections taken in planes at right angles to each other. The sleeve T is formed with a circumferential V or truncated V groove, $t'$, adapted to receive a correspondingly-shaped web or ridge, $u$, formed on the inner surface of a yoke or box, which is formed in two parts, U U', having flanges $u'$, adapted to be bolted together by bolts $u''$. An oil-cup, V, is supported by the upper half-yoke, U, from which duct $u^{iv}$ supplies lubricating-oil to the journal. A feather, $f$, on shaft F occupies a corresponding groove in sleeve T, and serves to guide said sleeve longitudinally on said shaft. The upper part, U, of the yoke is prolonged to form an arm, U'', adapted to carry upon its outer end a marking pen or pencil, W, which, actuated by the regulator, is made to record the varying speeds of the train at different parts of its route by means of the mechanism now to be described.

The shaft F is provided at one end with a worm, X, gearing with worm-wheel Y, keyed to shaft Y', which has bearings in supports or hangers $y$, bolted to and adjustable on standards $y'$, bolted adjustably to the base of the casing. The other end of shaft Y' is provided with worm Y'', gearing with worm-wheel 1, carried by a shaft, 2, to which is keyed or otherwise attached a drum, Z, over which the recording paper or ribbon passes, and by which it is driven. Shaft 2 has conical sockets or bearings at its ends for the reception of conically-pointed pivot-pins $z$, adjustable in standards 3 for the purpose of taking up wear in the bearings. The ribbon or recording-paper 7 is wound upon spools Z' Z'', hung upon pivot-pins $z'$ $z''$, respectively, also adjustable for taking up wear. The drum Z and spools Z' Z'' are all supported by means of adjustable pivot-pins, as described, on standards 3 3 4 4$^a$, bolted to the base of the casing and adjustable thereon by means of slots 5 therein to enable them to be accurately set to the desired position on the base. I have here shown gearing adapted to propel the ribbon at the rate of an inch a mile; but if it is desired to either increase or lessen the amount of paper fed per mile it is merely necessary to remove the worm-wheels Y and 1, substituting therefor worm-wheels of a greater or less number of spurs, according to whether it is desired to lessen or increase the speed of the ribbon. For this purpose the hanger $y$ is slotted, as shown at 5$^x$, to adapt the said hanger to be moved vertically, and the standard $y'$ is slotted, as shown at 6, to allow of its horizontal adjustment. By this means worm-wheels of any desired diameter can be inserted and accurately adjusted to mesh with the worms X and Y''. The ribbon 7, preferably of paper, is ruled with transverse lines at suitable distances to indicate miles traveled and with longitudinal lines to indicate distance traveled during a given space of time.

At Fig. 10 is illustrated the preferred form of pen employed by me. It consists of a reservoir, 8, within which slides a plunger, 9, carrying pen-point 10 for conveying ink to the paper from the reservoir, and forced down by spring 11 abutting against a plate, 12.

A cap, 13, screwed into the top of casing or reservoir 8, provides bearing for the plate 12, and when unscrewed permits access to the interior of the pen. This pen is held in an eye, 8, on the end of arm U″ of yoke U.

The following is the operation of the recorder: The train having been set in motion, rotary movement is communicated to shaft F by belts J H and pulleys I K G. The arm M, accurately balanced to respond to the least motion of the shaft, is gradually thrown out by centrifugal force to a position approaching a perpendicular as the speed of the train is increased. By means of the arm R and connecting-rods S S, bearing with equal force on opposite sides of the sleeve T, it is forced along its path on shaft F, carrying with it the yoke U, and marking pen or pencil W, which will thus indicate on the paper accurately the speed attained. At the same time the worm X on the shaft F, gearing with worm-wheel Y, actuates, through worm Y″, worm-wheel 1, and shafts Y′ and 2, the drum Z, over which the ribbon 7 from drums Z′ Z″ is wound. It will thus be seen that so long as the train is in motion the drum Z is rotated, and the ribbon 7 is positively fed from one spool to the other with a speed proportional to the distance traveled by the train. It is preferable to drive the paper through the medium of the said drum Z, instead of by means of spools Z′ Z″ alone, for the reason that the drum Z will always wind steadily, not being affected by the greater or less diameter of the coiled ribbon thereon, as either of the spools Z′ Z″ would be. The pen or pencil W is so held by arm U″, guided in a right line by the bar 14, supported by standards 3 3, as to be moved transversely across the paper ribbon by the oscillation of the regulator, the result being a wavy and irregular line thereon. The paper or ribbon being divided by transverse lines into spaces of width corresponding with the distance the drum is moved for every mile traveled by the train, it will be seen that the marking pen or pencil W, resting on the said ribbon, will accurately record the distance traveled by the train, and by the longitudinal lines upon the paper at suitable distances apart it will indicate the speed traveled per hour at any portion of its route, by the relative positions of the mile-marks and these lines. There will thus be recorded on the ribbon an accurate record of the time made and distance traveled by the train. It will be seen also that as the mechanism is adapted to run backward as well as forward any change in the direction of the train—as for switching—will be accurately recorded.

If desired to use the same ribbon for the return-trip of the train, so as to have the whole trip on one ribbon, it may be accomplished by simply crossing the belt H, when the ribbon will feed back again to the spool from which it was wound. For the return-trip the ink in the pen W should be changed to one of a different color for the sake of clearness.

To secure a more constant feed of the ribbon by giving greater friction between the same and the drum Z, I cover the surface of said drum with a layer of sand, powdered glass, or emery or sand paper, which has the advantage of being many times cheaper, while it is fully as effective as the series of steel points on the extremities of the drum now commonly in use on similar instruments.

To keep the ribbon constantly taut and to insure constant feed so long as the train is in motion, I provide springs 15, wound on shafts 16, each connecting standards 4 4ª, which support the spools Z′ Z″, respectively, the action of said springs being to keep the spools Z′ Z″ constantly and firmly against the drum Z.

In addition to the recording-instrument I have above described, I employ a mechanism for the purpose of actuating an indicator in the engineer's cab to keep him constantly informed of the speed of his train. To this end I attach to the yoke U a forked rod or lever, 17, which, passing through an opening or aperture in one end of the casing, is provided on its outer extremity with an eye, to which is secured the end of a wire or cord, 18, which, passing through pipe 19, around sheave or pulley 20, protected by angle-casing 21, through the hand-rail 22, around the sheave or pulley 23, and through pipe or tube 24 to the indicator-case 25, terminates in a chain, 26, wound upon drum 27 in the center of said indicator-case. The other end of said chain is attached to the projecting end of the helical spring 28, wound upon drum 29. The tension of the said spring may be increased or diminished at will by shifting its downturned end 30 from one to the other of the series of holes 31, arranged in a circle about said drum. By this means the tension of the spring 28 may be accurately adjusted to counterbalance the tension of the springs Q Q on arm M. On account of the great momentum of the balls O when the shaft F is revolved at a high speed it is necessary that the springs Q Q be made quite strong, rendering it impossible to secure great delicacy therein, especially at a low speed of revolution. For this reason I have found it advisable to use the spring 28, which, when accurately adjusted, so balances the effect of the springs Q Q on the regulator as to cause it to respond to a very slight speed of revolution of the shaft F. Instead of passing over the sheaves 20 23, the wire 18 may be jointed to bell-cranks at the points 21 and 21 of the projecting casing, but I prefer to use the sheaves, as described.

The advantages of the instrument herein described consist in its great delicacy, fitting it to respond to slight changes of speed; its simplicity, the connection from the shaft F to the drum Z being made by simply two worms and two worm-wheels; its strength, having few parts and those it has being compact and adapted to stand heavy strains; and its steadiness, so that although, as before stated, responding to the slightest changes in speed of the locomotive, it is not affected in the least by its jarring and uneven motion.

While I have here described my device as applicable to the fore truck of a locomotive, it is obvious that its usefulness is not restricted to this position, being also adapted to be placed on other parts of the train or in other places, steamboats, cars, &c.

Having thus described my invention, the following is what I claim as new therein and desire to secure by Letters Patent:

1. In a speed recorder for locomotives, the slotted driving-shaft F, carrying governors M M, O O, with a spring or springs, Q, and mechanism for actuating a recording pen or pencil, in combination with an indicator having a spring connected with the pen or pencil actuating mechanism, and balancing the resilience of the governor-springs, substantially as set forth.

2. The combination of slotted shaft F, hung on adjustable trunnion-pins E E, supported by the end plates of the casing, with the governors M M, hung on trunnion-pins N N, and controlled by spring or springs Q Q, substantially as set forth.

3. In a speed recorder for locomotives, the driving-shaft F, provided with worm X, the shaft Y', supported by adjustable standards $y'y'$, and carrying worm-wheel Y and worm Y'', in combination with the worm-wheel 1 and drum Z upon shaft 2, supported by standards 3, and the spools Z' Z'', mounted on standards 4 $4^a$, and in frictional contact with said drum Z, substantially as and for the purpose specified.

4. In a speed-recorder for locomotives, the driving-shaft F, carrying worm X, the shaft Y', mounted on adjustable standards $y\ y'$, and carrying worm-wheel Y' and worm Y'', and the worm-wheel 1 and drum Z on shaft 2, having bearings in standards 3, in combination with spools Z' Z'', mounted on standards 4 $4^a$, each of which is provided with a transverse bar, 16, and the springs 15, substantially as and for the purposes set forth.

5. In a speed-recorder for locomotives, the slotted driving-shaft F, carrying governors M M, O O, with spring or springs Q, arm R, and connecting-rods S, in combination with the sleeve T, yoke U U', with its arm U'', carrying a recording pen or pencil, W, and mechanism actuated by the driving-shaft for continuously feeding a recording-ribbon beneath said pen or pencil, substantially as described.

6. In a speed-recorder for locomotives, the driving-shaft F, with its worm X, shaft Y', with its worm-wheel Y and worm Y'', and the shaft 2, carrying worm-wheel 1, in combination with the adjustable standard $y$, with its slot $5^x$, and the standard $y'$, with its slot 6, substantially as set forth.

7. In a speed-recorder for locomotives, the slotted driving-shaft F, with its governors M M, O O, spring or springs Q, adjustable on said shaft by means of abutments P, arm R, connecting-rods S, and feather $f$, in combination with the sliding sleeve T, having groove $t'$, and yoke U, having a web of corresponding shape filling said groove $t'$, substantially as shown and described.

8. The combination of indicator-spring 28, having projecting end 30, with the base-plate having a circular series of holes, 31, therein, for the purpose set forth.

9. In a speed-recorder for locomotives, the recording mechanism located within casing A B C, said casing being provided with an opening or aperture, and the wire 18, attached to the divided arm 17 of the recording mechanism, in combination with tubes 19, angle-casings 21, hand-rail 22, and indicator 25, substantially as set forth.

10. In combination with base A, carrying half-partition $b$, the sides B B, attached to said base, and the top or cover C, hinged to said base, and having half-partition $c$, said half-partitions, when the casing is closed, uniting to form a diaphragm across the casing impervious to dust.

11. In a speed-recorder for locomotives, the indicator-spring 28, having a projecting end, 30, the base-plate having a circular series of holes, 31, therein, and the drum 27, in combination with the chain 26, attached at one end to the spring 28 and to the wire 18 at its other end, and coiled around the said drum 27, substantially as set forth.

12. In a speed-recorder for locomotives, the slotted driving-shaft carrying governors M M, O O and mechanism for actuating a recording pen or pencil, W, and provided with a pulley, G, in combination with the elastic hanger, L, carrying double pulley K, the pulley I, attached to the vehicle-axle, and the cords or belts H and J, substantially as and for the purpose set forth.

13. The combination of drum Z, mounted on standard 3, and provided with a friction-surface formed of a covering of sand or emery applied to its circumference, the spool Z', mounted on the adjustable standard $4^a$, the spool Z'', mounted on the adjustable standard 4, the shafts 16, connecting the standards 4 $4^a$, and provided with springs 15, and the ribbon 7, substantially as and for the purposes described.

JOHN C. HENRY.

Witnesses:
H. E. KNIGHT,
L. M. HOPKINS.